Figure 1:
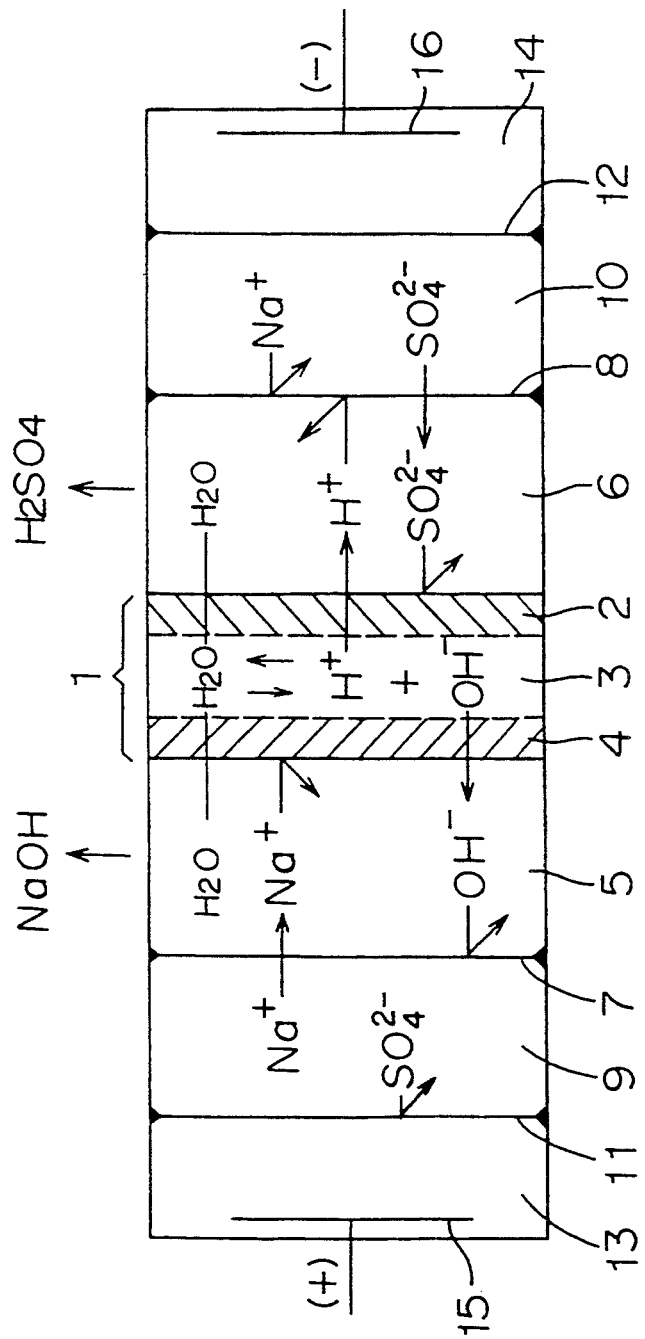

United States Patent [19]
Umemura et al.

[11] Patent Number: 5,401,408
[45] Date of Patent: Mar. 28, 1995

[54] BIPOLAR MEMBRANE

[75] Inventors: Kazuo Umemura; Tutomu Naganuma; Haruhisa Miyake, all of Yokohama, Japan

[73] Assignee: Asahi Glass Company Ltd., Tokyo, Japan

[21] Appl. No.: 161,262

[22] Filed: Dec. 3, 1993

[30] Foreign Application Priority Data

Dec. 4, 1992 [JP] Japan .................................. 4-350988
Dec. 4, 1992 [JP] Japan .................................. 4-350989
Mar. 16, 1993 [JP] Japan .................................. 5-081547

[51] Int. Cl.⁶ ............................................. B01D 29/00
[52] U.S. Cl. ................................ 210/490; 210/500.34; 210/506; 210/500.25; 210/638; 521/27; 204/180.2
[58] Field of Search .................... 210/500.34, 490, 506, 210/500.25, 638, 500.36; 521/27; 204/180.2

[56] References Cited

U.S. PATENT DOCUMENTS

| | | | |
|---|---|---|---|
| 4,132,682 | 1/1979 | Seita et al. | 521/27 |
| 4,200,538 | 4/1980 | Seita et al. | 521/27 |
| 4,253,900 | 3/1981 | Dege et al. | |
| 4,262,041 | 4/1981 | Eguchi et al. | 210/500.34 |
| 4,584,246 | 4/1986 | Liu et al. | 521/27 |
| 4,715,691 | 12/1987 | Sata et al. | 350/357 |

FOREIGN PATENT DOCUMENTS 2122543  1/1984  United Kingdom ........... 210/500.25

Primary Examiner—Robert A. Dawson
Assistant Examiner—Ana M. Fortuna
Attorney, Agent, or Firm—Oblon, Spivak, McClelland, Maier, & Neustadt

[57] ABSTRACT

A bipolar membrane comprising a cation exchange membrane, an anion exchange membrane and an inorganic ion exchanger layer having a thickness of from 0.01 to 100 μm present at the interface between the cation exchange membrane and the anion exchange membrane.

15 Claims, 1 Drawing Sheet

BIPOLAR MEMBRANE

The present invention relates to a bipolar membrane particularly useful for a water splitting method by electrodialysis.

It is widely known as reported by Frilette in 1956 that when an electric current is applied with a bipolar membrane interposed between the electrodes so that the anion exchange membrane side of the bipolar membrane faces the anode side and the cation exchange membrane side faces the cathode sided water will split and dissociate into hydrogen ions and hydroxyl ions.

The bipolar membrane is useful because of this ability, and it is known that by using it in combination with an anion exchange membrane and/or a cation exchange membrane as the case requires, it is possible to produce an acid such as sulfuric acid and an alkali such as sodium hydroxide by using a neutral salt such as Glauber's salt as a material. From the viewpoint of the production costs of the acid and the alkali, the voltage drop due to the membranes must be small, and at the same time, a bipolar membrane with high water dissociating efficiency is required. Such performance is required to last over a long period of time.

With respect to bipolar membranes and processes for their production, some have already been reported. For example, Japanese Examined Patent Publication No. 31860/1985 and Japanese Unexamined Patent Publication No. 95235/1988 disclose a bipolar membrane having cation exchange groups introduced by such a treatment as sulfonation on one side of a film made essentially of a styrene-divinyl benzene copolymer and having quaternary ammonium groups introduced as anion exchange groups on the other side. Further, U.S. Pat. No. 3,372,101 discloses a process wherein prefabricated anion exchange membrane and cation exchange membrane are fused under heat and pressure to form a bipolar membrane, and Japanese Unexamined Patent Publication No. 207444/1986 discloses a process wherein such prefabricated anion and cation exchange membranes are bonded by means of a polyvinyl amine as an adhesive.

However, these bipolar membranes have a drawback that since they have cation exchange groups and anion exchange groups in the same membranes, such groups having opposite electric charges intrude mutually and ionically bond to each other to form ionic complex (a neutral layer), whereby a substantial voltage drop will result.

To avoid such a drawback, U.S. Pat. No. 4,253,900 and U.S. Pat. No. 4,116,889 propose a bipolar membrane having an organic ion exchange resin having a highly crosslinked structure interposed between a cation exchange membrane and an anion exchange membrane to prevent the mutual intrusion of the groups having opposite electric charges. Further, Japanese Unexamined Patent Publication No. 47235/1984 and International PCT Publication No. WO89/01059 disclose a bipolar membrane produced in such a manner that a water-soluble inorganic compound is impregnated to the interface of the cation exchange membrane or the anion exchange membrane, or so impregnated and then alkali-treated, followed by pressing.

However, such conventional bipolar membranes have the following drawbacks. Namely, in the case where a highly crosslinked ion exchange resin is interposed at the interface, the mutual intrusion of ion exchange groups can not be adequately prevented by such an organic substance even if it is highly crosslinked, whereby the voltage drop will increase as the time passes. On the other hand, in the case where an inorganic compound is interposed at the interface, such a compound tends to gradually elute out of the membrane, whereby the voltage drop will increase as the time passes.

It is an object of the present invention to solve the drawbacks of conventional bipolar membranes as described above and to provide a bipolar membrane whereby the voltage drop is small, the water dissociating efficiency is high, and yet constant performance can be obtained over a long period of time.

According to the present invention, the above object has been accomplished by a bipolar membrane comprising a cation exchange membrane, an anion exchange membrane and an inorganic ion exchanger layer having a thickness of from 0.01 to 100 $\mu$m present at the interface between the cation exchange membrane and the anion exchange membrane.

In the accompanying drawing, FIG. 1 is a schematic view of an apparatus for electrodialysis useful for evaluating a bipolar membrane.

Now, the present invention will be described in detail with reference to the preferred embodiments.

In the present invention, various types may be employed as the inorganic ion exchanger which forms the interface between the cation exchange membrane and the anion exchange membrane. For example, an aluminosilicate inorganic ion exchanger, a hydroxide-containing (hydrous oxide) inorganic ion exchanger, an acid salt inorganic ion exchanger, a basic salt type inorganic ion exchanger or a heteropoly acid inorganic ion exchanger may be employed. Further, a cation exchanger, an anion exchanger or an amphoteric ion exchanger may be employed. Typical examples of the inorganic ion exchanger to be used in the present invention include hydrated zirconium oxide, hydrated titanium oxide, hydrated bismuth oxide, hydrated manganese oxide, an antimonate, an aluminosilicate, zeolite, tobamolite, ammonium molybdophosphate, hexacyano iron (III) cobalt (II) potassium, and potassium titanate. The inorganic ion exchanger is preferably crystalline, since the solubility is thereby low, and it is thereby more readily possible to prevent the mutual intrusion of the groups having opposite electric charges.

As the inorganic ion exchanger for the present invention, it is preferred to employ an acid base type inorganic ion exchanger, since it is excellent in the acid resistance and alkali resistance and it is capable of providing a constant performance over a long period of time. As the metal ion of the acid salt type inorganic ion exchanger, Zr, Ti, Sn, Ge, Hf, Ta, Nb, Fe, Al, Ga, In or Th may, for example, be employed, and as the acid, an oxygen acid of e.g. V, As, Nb, Sb, Ta, Mo, Te, W, Se, Si or Cr may, for example, be used as well as phosphoric acid. Among them, an acid salt inorganic ion exchanger wherein the metal ion is a cation having tri or higher valency, is preferred. Typical examples of the acid salt inorganic ion exchanger to be used in the present invention, include zirconium phosphate, titanium phosphate, tin phosphate, zirconium molybdate, tin tungstate, titanium antimonate and hydroxy apatite.

The particle size of the inorganic ion exchanger is preferably not more than 1 $\mu$m. If the particle size exceeds 1 $\mu$m, the bond strength between the anion exchange membrane and the cation exchange membrane tends to be low, and bubbles are likely to be included at the bonding interface at the time of bonding, such being undesirable. The particle size is more preferably from 0.01 to 0.5 μm.

When the above inorganic ion exchanger layer is formed in the present invention, it is preferred to employ a matrix polymer so that the layer will be formed by the inorganic ion exchanger and the matrix polymer.

As such a matrix polymer, a hydrophilic polymer which is insoluble in water, is preferred, and the water content in water at the temperature during the use of the bipolar membrane, i.e. (wet weight—dry weight)/dry weight×100, is preferably at least 5% by weight, more preferably at least 50% by weight. If the water content is smaller than this level, the voltage drop by the bipolar membrane tends to be substantial, such being undesirable. The upper limit is usually not higher than 400% by weight, preferably not higher than 200% by weight. If the water content is too high, the bond strength tends to be poor, and peeling is likely to result, such being undesirable. At the same time, the matrix polymer preferably has no ion exchangeable functional groups. For example, polyvinyl acetate, polyvinyl alcohol, polyvinyl pyrrolidone, polyacrylamide, polyvinyl methylether, polyethylene oxide, starch, cellulose or these polymers insolubilized by a technique such as heat treatment or crosslinking, or their copolymers with other monomers or their mixtures with other polymers, may be employed.

The inorganic ion exchanger particles and the matrix polymer are used usually in a weight ratio of from 10/90 to 90/10, preferably from 30/70 to 70/30.

The thickness of the ion exchanger layer is preferably from 0.01 to 100 μm, more preferably from 0.1 to 50 μm. If the acid salt inorganic ion exchanger layer is thinner than this range, the voltage drop by the bipolar membrane tends to gradually increase. On the other hand, if it is thicker than this range, the bond strength between the anion exchange membrane and the cation exchange membrane tends to be low, such being undesirable.

Various means may be employed as a method for providing the inorganic ion exchanger layer between the anion exchange membrane and the cation exchange membrane. However, the following means is preferably employed. Namely, a solution or paste having the inorganic ion exchanger dispersed in a solvent or in a solution of the matrix polymer, is deposited on the surface of a cation exchange membrane or an anion exchange membrane by coating, casting, spraying, screen printing or heat transfer, and then an ion exchange membrane having an electric charge opposite to the ion exchange membrane having the inorganic ion exchanger deposited, is bonded thereto by casting, heat-pressing or the like.

To minimize the voltage drop, it is preferred to provide the inorganic ion exchanger layer over the entire interface between the cation exchange membrane and the anion exchange membrane. However, in order to increase the bond strength between the cation exchange membrane and the anion exchange membrane, it is preferred to provide it over an area corresponding to from 25 to 95% of the interface. If the area on which the inorganic ion exchanger layer is provided, is smaller than this range, the bond strength tends to be low, and if the area is larger than this range, the voltage drop tends to be substantial, such being undesirable. Further, it is most preferred to provide it on the electrodialytic area only, since it is thereby possible to obtain a large bond strength and to maintain the voltage drop at a minimum level.

As the cation exchange membrane constituting the bipolar membrane of the present invention, a cation exchange membrane may be used which provides good permeability for hydrogen ions formed in the bipolar membrane and which scarcely permeate anions. Preferably, a strongly acidic cation exchange membrane having sulfonic acid groups may, for example, be mentioned. As such a strongly acidic cation exchange membrane, a membrane having sulfonic acid groups introduced to an aromatic ring-containing polymer film such as a styrene-divinyl benzene polymer film or a styrene-butadiene polymer film, or a membrane having sulfonic acid groups introduced to a product obtained by graft polymerizing a monomer such as styrene to an olefinic or fluorine-containing polymer, woven fabric, non-woven fabric or the like, may, for example, be mentioned.

Further, a cation exchange membrane made of a perfluorocarbon polymer having the formula (1) is particularly preferred, since it is excellent in the heat resistance and acid resistance against sulfuric acid, nitric acid or hydrofluoric acid in addition to its excellent current efficiency. Such a cation exchange membrane has a high anion-excluding property, since the ion exchange groups form a cluster structure, whereby it provides high water-dissociating efficiency when formed into a bipolar membrane.

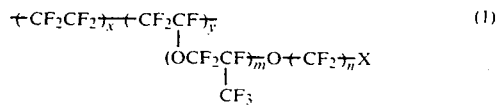

(1)

In the formula (1), m is 0 or 1, n is from 1 to 5, x/y is from 2 to 16, X is SO₃M or COOM, wherein M is hydrogen, an alkali metal, an alkaline earth metal or an ammonium group.

The thickness of the cation exchange membrane constituting the bipolar membrane is usually within a range of from 5 to 300 μm. However, from the viewpoint of the membrane resistance and strength, the thickness is preferably within a range of 20 to 150 μm. The ion exchange capacity is preferably from 0.5 to 2.0 meq/g dry resin, more preferably from 0.8 to 1.5 meq/g dry resin from the viewpoint of the membrane resistance and transport number.

As the anion exchange membrane constituting the bipolar membrane of the present invention, an anion exchange membrane having large permeability for hydroxyl ions formed in the bipolar membrane and minimum permeability for cations, is used. For example, a membrane made of a styrene polymer or a copolymer of styrene with divinyl benzene supported on a polyolefin substrate and having quaternary ammonium groups as anion exchange groups, may be employed.

Particularly preferred in view of the excellent alkali resistance and chemical resistance is an anion exchange membrane having quaternary ammonium groups, in which a polyolefin substrate such as polypropylene or polyethylene is used and a part of a copolymer of styrene with divinyl benzene or a copolymer having vinyl benzyl chloride added thereto is graft-polymerized to a woven fabric of polyolefin by a high energy such as radiation.

The thickness of the anion exchange membrane constituting the bipolar membrane is usually within a range of from 5 to 300 μm. However, from the viewpoint of the membrane resistance and strength, the thickness is preferably within a range of from 20 to 150 μm. The ion exchange capacity is preferably from 0.5 to 4.0 meq/g dry resin, more preferably from 0.8 to 3.0 meq/g dry resin.

With the bipolar membrane of the present invention, a small voltage drop can be maintained for a long period of time as mentioned above, and the mechanism is considered to be as follows. Namely, the inorganic ion exchanger present at the interface of the bipolar membrane of the present invention has a firm structure, whereby ion exchange groups of the ion exchange membranes bonded to the inorganic ion exchanger layer, can not intrude and therefore hardly form ionic bonds to form a neutral layer. Further, the inorganic ion exchanger layer has a low electrical resistance, since it has a large ion exchange capacity per volume, as compared with the ion exchange resins, and it has a structure capable of holding a large quantity of water, whereby the voltage drop of the bipolar membrane can be minimized. Further, in the case of an interface layer having inorganic ion exchanger particles dispersed in a matrix polymer, the inorganic exchanger can be maintained in an adequate amount at the interface region, and it is possible to introduce the inorganic ion exchanger to the interface without impairing the bond strength.

In the present invention, to form the interface layer between the cation exchange membrane and the anion exchange membrane using the inorganic ion exchanger, various modifications can be made within the scope of the present invention.

For example, it is possible to use an interface layer comprising the inorganic ion exchanger dispersed in an ion exchange polymer having an electric charge opposite to the inorganic ion exchanger.

The ion exchange polymer to be used for the interface layer of the present invention may be an anion exchange polymer when the inorganic ion exchanger is a cation exchanger, or a cation exchange polymer when the inorganic ion exchanger is an anion exchanger, or a cation and/or anion exchanger polymer when the inorganic ion exchanger is an amphoteric ion exchanger. When a cation exchange polymer is used as the ion exchange polymer, there is no particularly restriction as to the ion exchange groups. However, an ion exchange polymer having strongly acidic sulfonic acid groups is preferably employed. For example, a polymer soluble in a solvent, for example, a polymer having an aromatic ring such as a styrene-divinylbenzene polymer, a styrene-butadiene polymer, a polysulfone, a polyphenylene oxide or a polyether sulfone having sulfonic groups introduced, may be mentioned. Further, a perfluoro type cation exchange polymer having repeating units of the formula (1) is also preferably used, since it is soluble in a solvent and further has acid resistance.

When an anion exchange polymer is used as the ion exchange polymer, there is no particular restriction as to the ion exchange groups. However, an ion exchanger polymer having strongly basic quaternary ammonium groups, is preferably employed. For example, a polymer soluble in a solvent, for example, a polymer having an aromatic ring such as a styrene-divinylbenzene polymer, a styrene-butadiene polymer, a polysulfone, a polyphenylene oxide or a polyether sulfone having quaternary ammonium groups introduced, may be mentioned.

The ion exchange capacity of the ion exchange polymer to be used for the interface layer varies depending upon the particular ion exchange polymer used. However, it is preferably from 0.5 to 4.0 meq/g dry resin, more preferably from 0.8 to 3.0 meq/g dry resin, from the viewpoint of the membrane strength and the voltage drop by the membrane.

Further, for the formation of the interface layer between the cation exchange membrane and the anion exchange membrane, a metal alkoxide may be employed, and a solution having the inorganic ion exchanger dispersed in the metal alkoxide may be coated on the interfacial surface of the membrane, followed by baking, to form the interface layer.

In such a case, it is preferred that a metal alkoxide-containing solution having the inorganic ion exchanger particles dispersed therein, preferably a solution having the inorganic ion exchanger particles dispersed in the form of a sol, is coated on an ion exchange membrane and then dried, followed by baking at a temperature of from 100° to 400° C., more preferably from 200° to 300° C., whereby a uniform inorganic ion exchanger layer can be obtained without deteriorating the ion exchange capacity of the inorganic ion exchanger, and the bond strength with the ion exchange membrane is high, such being desirable. The metal alkoxide to be used in the present invention, may be a metal alkoxide wherein the alcohol preferably has from 1 to 10 carbon atoms, more preferably from 2 to 7 carbon atoms, and the metal is preferably Si, Al, Ti, Zn or the like.

Further, in the present invention, it is possible to increase the bond strength and to reduce the voltage drop of the bipolar membrane by preliminarily roughening the membrane surface of the ion exchange membrane which will be in contact with the interface layer when the interface layer is introduced between the anion exchange membrane and the cation exchange membrane. As surface roughening methods, various methods are known depending upon the degree of roughness, and any methods may suitably be employed depending upon the size of the inorganic ion exchanger. For example, sanding by means of e.g. sand paper, thermaltransfer by woven fabric, non-woven fabric, embossed film or embossed roll, or plasma surface treatment or etching, may be employed.

Now, the present invention will be described in further detail with reference to Examples. However, it should be understood that the present invention is by no means restricted by such specific Examples.

EXAMPLE 1

An inorganic ion exchanger layer of hydrated zirconium oxide having a thickness of 5 μm was formed by screen printing on an anion exchange membrane (ion exchange capacity: 3.0 meq/g dry resin, thickness; 120 μm) made of a styrene-divinylbenzene copolymer supported on a polypropylene woven fabric and having quaternary ammonium groups. Then, a cation exchange membrane (ion exchange capacity: 1.1 meq/g dry resin, thickness: 80 μm) made of a polymer of $CF_2=CF_2$ with $CF_2=CFOCF_2CF(CF_3)OCF_2CF_2SO_3H$ was roll-pressed thereon at 190° C. under a pressure of 70 kg/cm to obtain a bipolar membrane. The bipolar membrane was stored in a 0.5N sodium chloride aqueous solution, and then its performance was evaluated as a bipolar membrane 1 in an electrodialysis cell as shown in FIG. 1.

In the electrodialysis cell of FIG. 1, a 15 wt % sodium sulfate aqueous solution was supplied to an anode compartment 13, a cathode compartment 14 and neutral salt compartments 9 and 10; deionized water was supplied to an alkali-forming compartment 5 so that the concentration of sodium hydroxide formed therein would be 20% by weight; and deionized water was supplied to an acid-forming compartment 6 so that the concentration of the aqueous sulfuric acid solution formed therein would be 10% by weight.

For cation exchange membranes 7, 11 and 12, styrene-divinylbenzene copolymer sulfonic acid membranes (ion exchange capacity: 3.3 meq/g dry resin, thickness: 140 μm) were employed, and for an anion exchange membrane 8, a styrene-divinylbenzene copolymer weakly basic anion exchange membrane (ion exchange capacity: 2.0 meq/g dry resin, thickness: 120 μm) was employed. Electrodialysis was carried out at 60° C. at a current density of 10 A/dm$^2$, whereby the voltage drop by the bipolar membrane was 1.2 V, and the water-dissociating efficiency was at least 95%. This performance did not change even upon expiration of three months.

EXAMPLE 2

An aluminosilicate layer having a thickness of 10 μm was formed by screen printing on the same anion exchange membrane for a bipolar membrane as used in Example 1. Then, the same cation exchange membrane for a bipolar membrane as used in Example 1 was roll-pressed thereon at 190° C. under a pressure of 90 kg/cm to obtain a bipolar membrane. This bipolar membrane was subjected to a performance test in the same manner as in Example 1, whereby the voltage drop was 1.3 V, and the water-dissociating efficiency was at least 95%. This performance did not change even upon expiration of three months.

EXAMPLE 3

An ammonium molybdophosphate layer having a thickness of 10 μm was formed by a spray method on the same cation exchange membrane for a bipolar membrane as used in Example 1. Then, the same anion exchange membrane for a bipolar membrane as used in Example 1 was roll-pressed thereon at 190° C. under a pressure of 70 kg/cm to obtain a bipolar membrane. This bipolar membrane was subjected to a performance test in the same manner as in Example 1, whereby the voltage drop was 1.3 V, and the water-dissociating efficiency was at least 95%. This performance did not change even upon expiration of three months.

EXAMPLE 4

A dispersion of zirconium phosphate was coated on an anion exchange membrane (ion exchange capacity: 3.0 meq/g dry resin, thickness: 120 μm) made of a styrenedivinylbenzene copolymer and reinforced with a polypropylene woven fabric and having quaternary ammonium groups, followed by drying to form a zirconium phosphate layer having a thickness of 5 μm. Then, a cation exchange membrane (ion exchange capacity: 1.1 meq/g dry resin, thickness: 80 μm) made of a copolymer of $CF_2=CF_2$ with $CF_2=CFOCF_2CF(CF_3)OCF_2CF_2SO_3H$, was roll-pressed thereon at 190° C. under a pressure of 70 kg/cm to obtain a bipolar membrane. This bipolar membrane was stored in a 0.5N sodium chloride aqueous solution, and then its performance was evaluated under the same conditions as in Example 1 as a bipolar membrane 1 in an electrodialysis cell as shown in FIG. 1.

For cation exchange membranes 7, 11 and 12, styrene-divinylbenzene copolymer type sulfonic acid membranes (ion exchange capacity: 3.3 meq/g dry resin, thickness: 140 μm) were used, and for an anion exchange membrane 8, a styrene-divinylbenzene copolymer type weakly basic anion exchange membrane (ion exchange capacity: 2.0 meq/g dry resin, thickness: 120 μm) was used. Electrodialysis was carried out at 60° C. at a current density of 10 A/dm$^2$, whereby the voltage drop by the bipolar membrane was 1.0 V, and the water-dissociating efficiency was at least 95%. This performance did not change even upon expiration of three months.

EXAMPLE 5

A titanium phosphate layer having a thickness of 1 μm was formed by screen printing on the same anion exchange membrane for a bipolar membrane as used in Example 4, and the same cation exchange membrane for a bipolar membrane as used in Example 4 was roll-pressed thereon at 190° C. under a pressure of 70 kg/cm to obtain a bipolar membrane. The performance of this bipolar membrane was evaluated in the same manner as in Example 4, whereby the voltage drop was 1.0 V, and the water-dissociating efficiency was at least 95%. This performance did not change even upon expiration of three months.

EXAMPLE 6

A zirconium molybdate layer having a thickness of 1 μm was formed by screen printing on the same anion exchange membrane for a bipolar membrane as used in Example 4. Then, ethanol solution of a cation exchanger (ion exchange capacity: 0.91 meq/g dry resin) made of a copolymer of $CF_2=CF_2$ with $CF_2=CFOCF_2CF(CF_3)OCF_2CF_2SO_3H$, was cast thereon and dried at 150° C. for 15 minutes to form a cation exchange membrane having a thickness of 30 μm thereby to obtain a bipolar membrane. The performance of this bipolar membrane was evaluated in the same manner as in Example 4, whereby the voltage drop was 1.0 V, and the water-dissociating efficiency was at least 95%. This performance did not change even upon expiration of three months.

EXAMPLE 7

A tin tungstate layer having a thickness of 10 μm was formed by screen printing on the same anion exchange membrane for a bipolar membrane as used in Example 4, and the same cation exchange membrane for a bipolar membrane as used in Example 4 was roll-pressed at 190° C. under a pressure of 70 kg/cm$^2$ to obtain a bipolar membrane. The performance of this bipolar membrane was evaluated in the same manner as in Example 4, whereby the voltage drop was 1.1 V, and the water-dissociating efficiency was at least 95%. This performance did not change even upon expiration of three months.

EXAMPLE 8

A titanium antimonate layer having a thickness of 0.1 μm was formed by a spray method on the same anion exchange membrane for a bipolar membrane as used in Example 4, and the same cation exchange membrane for a bipolar membrane as used in Example 4 was roll-pressed thereon at 190° C. under a pressure of 70 kg/cm to obtain a bipolar membrane. The performance of this bipolar membrane was evaluated in the same manner as in Example 4, whereby the voltage drop was 1.0 V and the water-dissociating efficiency was at least 95%. This performance did not change even upon expiration of three months.

EXAMPLE 9

A dispersion of crystalline zirconium phosphate in a 10 wt % polyvinyl alcohol aqueous solution was coated on an anion exchange membrane (ion exchange capacity: 3.0 meq/g dry resin, thickness: 120 μm) made of a styrene-divinylbenzene copolymer and reinforced with a polypropylene woven fabric and having quaternary ammonium groups, followed by drying to form a zirconium phosphate/polyvinyl alcohol layer (weight ratio: 60/40) having a thickness of 5 μm. Then, a cation exchange membrane (ion exchange capacity: 1.1 meq/g dry resin, thickness: 80 μm) made of a copolymer of $CF_2=CF_2$ with $CF_2=CFOCF_2CF(CF_3)OCF_2CF_2SO_3H$, was overlaid on the zirconium phosphate/polyvinyl alcohol layer, followed by pressing to obtain a bipolar membrane. This bipolar membrane was stored in a 0.5N sodium chloride aqueous solution, and then its performance was evaluated under the same conditions as in Example 1 in an electrodialysis cell as shown in FIG. 1.

For a cation exchange membrane 7, 11 and a styrene-divinylbenzene copolymer type sulfonic acid membrane (ion exchange capacity: 3.3 meq/g dry resin, thickness: 140 μm) were used, and for an anion exchange membrane 8, a styrene-divinylbenzene copolymer type weakly basic anion exchange membrane (ion exchange capacity: 2.0 meq/g dry resin, thickness: 120 μm) was employed. Electrodialysis was carried out at 60° C. at a current density of 10 A/dm², whereby the voltage drop by the bipolar membrane was 1.0 V, and the water-dissociating efficiency was at least 95%. This performance did not change even upon expiration of three months.

EXAMPLE 10

A titanium phosphate/polyvinyl alcohol layer having a thickness of 1 μm was formed by screen printing on the same anion exchange membrane as used in Example 19, and the same cation exchange membrane as used in Example 9 was pressed thereon at 190° C. under a pressure of 70 kg/cm² to obtain a bipolar membrane. The performance of this bipolar membrane was evaluated in the same manner as in Example 9, whereby the voltage drop was 1.1 V, and the water-dissociating efficiency was at least 95%. This performance did not change even upon expiration of three months.

EXAMPLE 11

A zirconium molybdate/polyvinylacetate layer having a thickness of 1 μm was formed by screen printing on the same anion exchange membrane as used in Example 9. An ethanol solution of a cation exchanger (ion exchange capacity: 0.91 meq/g dry resin) made of a copolymer of $CF_2=CF_2$ with $CF_2=CFOCF_2CF(CF_3)OCF_2CF_2SO_3H$, was cast on such a zirconium molybdate/polyvinylacetate layer and dried at 150° C. for 15 minutes to form a cation exchange membrane having a thickness of 30 μm thereby to obtain a bipolar membrane. The performance of this bipolar membrane was evaluated in the same manner as in Example 9, whereby the voltage drop was 1.0 V, and the water-dissociating efficiency was at least 95%. This performance did not change even upon expiration of three months.

EXAMPLE 12

A tin tungstate/cellulose layer having a thickness of 10 μm was formed by screen printing on the same anion exchange membrane as in Example 9, and the same cation exchange membrane as used in Example 9 was pressed thereon at 190° C. under a pressure of 70 kg/cm² to obtain a bipolar membrane. The performance of this bipolar membrane was evaluated in the same manner as in Example 9, whereby the voltage drop was 1.1 V, and the water-dissociating efficiency was at least 95%. This performance did not change even upon expiration of three months.

EXAMPLE 13

A titanium antimonate/poly(N,N-dimethylacrylamide) layer having a thickness of 1 μm preliminarily formed on a polyterephthalate film, was heat-transfered at 150° C. on the same anion exchange membrane as used in Example 9, and the same cation exchange membrane as used in Example 9 was pressed thereon at 190° C. under a pressure of 70 kg/cm² to obtain a bipolar membrane. The performance of this bipolar membrane was evaluated in the same manner as in Example 9, whereby the voltage drop was 1.0 V, and the water-dissociating efficiency was at least 95%. This performance did not change even upon expiration of three months.

EXAMPLE 14

Crystalline zirconium phosphate having a particle size of 0.2 μm was added to a dimethylformamide solution containing 15% by weight of a polysulfone having quaternary ammonium groups introduced thereto, so that the weight ratio of the crystalline zirconium phosphate to the polysulfone would be 1:1, and the mixture was thoroughly stirred to obtain a dispersion. This dispersion was coated on an anion exchange membrane (ion exchange capacity: 3.0 meq/g dry resin, thickness: 120 μm) made of a styrene-divinylbenzene copolymer and reinforced with a polypropylene woven fabric and having quaternary ammonium groups, followed by drying at 60° C. to form an interface layer having a thickness of 5 μm. An ethanol solution of a cation exchanger (ion exchange capacity: 1.1 meq/g dry resin, thickness: 80 μm) made of a copolymer of $CF_2=CF_2$ with $CF_2=CFOCF_2CFCF_3CF_2CF_2SO_3H$, was cast thereon, dried at 60° C. and then heat-treated at 150° C. for 15 minutes to obtain a bipolar membrane. This bipolar membrane was stored in a 0.5N sodium chloride aqueous solution, and then its performance was evaluated under the same conditions as in Example 1 in an electrodialysis cell as shown in FIG. 1.

For cation exchange membranes 7, 11 and 12, styrene-divinylbenzene copolymer type sulfonic acid membranes (ion exchange capacity: 3.3 meq/g dry resin, thickness: 140 μm) were used, and for an anion exchange membrane 8, a styrene-divinylbenzene copolymer type weakly basic anion exchange membrane (ion exchange capacity: 2.0 meq/g dry resin, thickness: 120 μm) was used. Electrodialysis was carried out at 60° C. at a current density of 10 A/dm², whereby the voltage drop by the bipolar membrane was 1.0 V, and the water-dissociating efficiency was at least 95%. This performance did not change even upon expiration of three months, and no peeling of the membrane was observed.

EXAMPLE 15

Bismuth hydroxide having a particle size of 0.5 μm was added to the same ethanol solution of a cation exchanger as used in Example 14 so that the weight ratio would be 1:1, and the mixture was thoroughly stirred to obtain a dispersion. This dispersion was coated by screen printing on the same anion exchange membrane as used in Example 14 and dried at 60° C. to form an interface layer having a thickness of 1 μm. Then, the same cation exchange membrane (80 μm) as used in Example 14 was pressed thereon at 190° C. under a pressure of 70 kg/cm to obtain a bipolar membrane. This bipolar membrane was subjected to a performance test in the same manner as in Example 14, whereby the voltage drop was 1.1 V, and the water-dissociating efficiency was at least 95%. This performance did not change even upon expiration of three months, and no peeling of the membrane was observed.

EXAMPLE 16

An anion exchange membrane (ion exchange capacity: 3.0 meq/g dry resin, thickness: 120 μm) made of a styrene-divinylbenzene copolymer and reinforced with a polypropylene woven fabric and having quaternary ammonium groups, was polished with sand paper, then thoroughly washed with water and dried. A liquid obtained by mixing a 10 wt % crystalline zirconium phosphate aqueous dispersion, 30 parts by weight of Si(OC$_2$H$_5$)$_4$, 30 parts by weight of H$_2$O, 40 parts by weight of C$_2$H$_5$OH and 0.5 part by weight of HCl, was coated thereon, dried at 60° C. and baked at 200° C. for 15 minutes to form an inorganic ion exchanger layer having a thickness of 5 μm. An ethanol solution containing 9.2% by weight of a cation exchanger (ion exchange capacity: 1.1 meq/g dry resin) made of a copolymer of CF$_2$=CF$_2$ with CF$_2$=CFOCF$_2$CFCF$_3$CF$_2$CF$_2$SO$_3$H, was cast thereon and dried at 150° C. for 15 minutes to obtain a bipolar membrane. This bipolar membrane was stored in a 0.5N sodium chloride aqueous solution, and then its performance was evaluated under the same conditions as in Example 1 in an electrodialysis cell as shown in FIG. 1.

For cation exchange membranes 7, 11 and 12, styrene-divinylbenzene copolymer type sulfonic acid membranes (ion exchange capacity: 3.3 meq/g dry resin, thickness: 140 μm) were used, and for an anion exchange membrane 8, a styrene-divinylbenzene copolymer type weakly basic anion exchange membrane (ion exchange capacity: 2.0 meq/g dry resin, thickness: 120 μm) was employed. Electrodialysis was carried out at 60° C. at a current density of 10 A/dm$^2$, whereby the voltage drop by the bipolar membrane was 1.2 V, and the water-dissociating efficiency was at least 95%. This performance did not change even upon expiration of three months, and no peeling of the membrane was observed.

EXAMPLE 17

The same cation exchanger membrane as used in Example 16 was surface-roughened by heat transfer of an embossed film. Then, a liquid obtained by mixing a 10 wt % crystalline bismuthhydroxide aqueous dispersion, 30 parts by weight of Si(OC$_2$H$_5$)$_4$, 30 parts by weight of H$_2$O, 40 parts by weight of C$_2$H$_5$OH and 0.5 part by weight of HCl, was coated thereon, dried at 60° C. and baked at 250° C. for 30 minutes to form an inorganic ion exchanger layer having a thickness of 1 μm.

Then, 10 wt % polyvinyl alcohol was coated thereon and dried. Then, the same anion exchange membrane as used in Example 16 was pressed thereon at 190° C. under a pressure of 70 kg/cm$^2$ to obtain a bipolar membrane. This bipolar membrane was subjected to a performance test in the same manner as in Example 16, whereby the voltage drop was 1.4 V, and the water-dissociating efficiency was at least 95%. This performance did not change even expiration of three months, and no peeling of the membrane was observed.

We claim:

1. A bipolar membrane comprising a cation exchange membrane, an anion exchange membrane and an inorganic ion exchanger layer having a thickness of from 0.01 to 100 μm present at the interface between the cation exchange membrane and the anion exchange membrane.

2. The bipolar membrane according to claim 1, wherein the inorganic ion exchanger is an acid salt type inorganic ion exchanger.

3. The bipolar membrane according to claim 2, wherein the acid salt inorganic ion exchanger is of a metal cation having a tri or higher valency.

4. The bipolar membrane according to claim 1, wherein the cation exchange membrane is made of a copolymer having the formula (1):

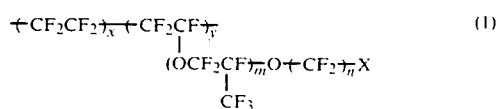

wherein m is 0 or 1, n is from 1 to 5, x/y is from 2 to 16, X is SO$_3$M or COOM, wherein H is hydrogen, an alkali metal, an alkaline earth metal or an ammonium group.

5. The bipolar membrane according to claim 1, wherein the union exchange membrane is made of a styrene polymer or a copolymer of styrene with divinyl benzene supported on a polyolefin substrate and has quaternary ammonium groups as anion exchange groups.

6. A bipolar membrane comprising a cation exchange membrane, an anion exchange membrane and a layer composed of inorganic ion exchanger particles and a matrix polymer present at the interface between the cation exchange membrane and the anion exchange membrane.

7. The bipolar membrane according to claim 6, wherein the matrix polymer has a water content of at least 5% in water during the use of the bipolar membrane.

8. The bipolar membrane according to claim 7, wherein the matrix polymer has no ion exchangeable functional groups.

9. The bipolar membrane according to claim 6, wherein the inorganic ion exchanger is a crystalline acid salt inorganic ion exchanger.

10. The bipolar membrane according to claim 6, wherein the cation exchange membrane is made of a polymer having the formula (1):

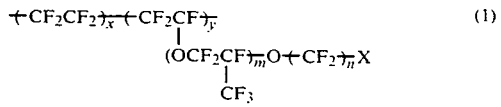

wherein m is 0 or 1, n is 1 to 5, x/y is from 2 to 16, X is SO$_3$M or COOM, wherein M is hydrogen, an alkali metal, an alkaline earth metal or an ammonium group.

11. The bipolar membrane according to claim 6, wherein the anion exchange membrane is made of a styrene polymer or a copolymer of styrene with divinyl benzene supported on a polyolefin film or cloth and has quaternary ammonium groups as anion exchange groups.

12. A bipolar membrane comprising a cation exchange layer, an anion exchange layer and an interface layer interposed between the cation exchange layer and the anion exchange layer, said interface layer having dispersed in an ion exchange polymer an inorganic ion exchanger having an electric charge opposite to the electric charge of said ion exchange polymer.

13. The bipolar membrane according to claim 12, wherein the inorganic ion exchanger is a crystalline inorganic ion exchanger.

14. A bipolar membrane comprising a cation exchange membrane, an anion exchange membrane and an inorganic ion exchanger layer interposed between the cation and anion exchange membranes, said inorganic ion exchanger layer having been formed by coating a metal alkoxide-containing solution having particles of an inorganic ion exchanger dispersed therein, followed by baking.

15. The bipolar membrane according to claim 14, wherein the inorganic ion exchanger is a crystalline inorganic ion exchanger.

* * * * *